Nov. 7, 1933.  B. W. KEESE  1,933,671
BRAKE MECHANISM
Filed Jan. 27, 1930  2 Sheets-Sheet 1
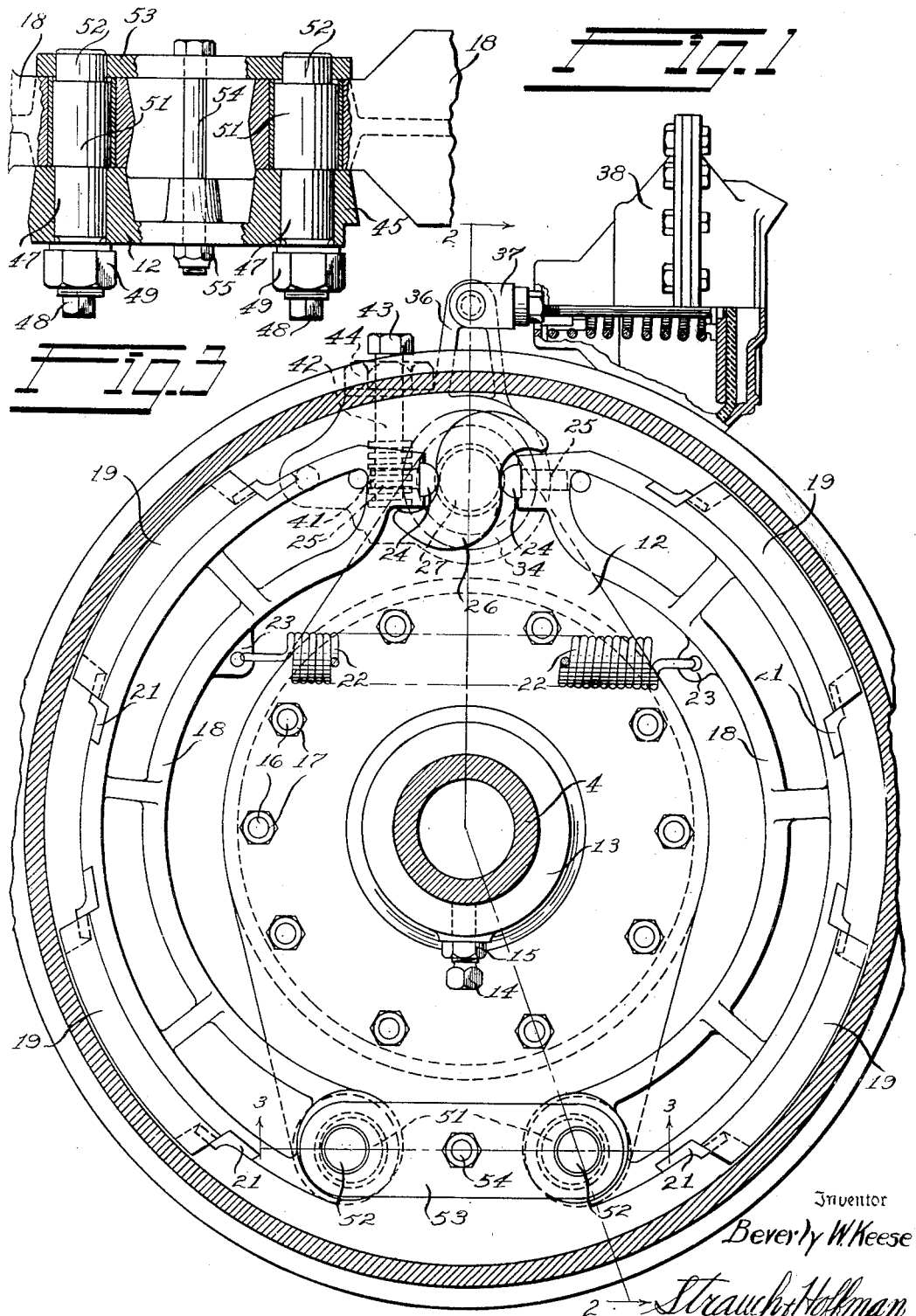
Inventor
Beverly W. Keese
Strauch + Hoffman
Attorneys

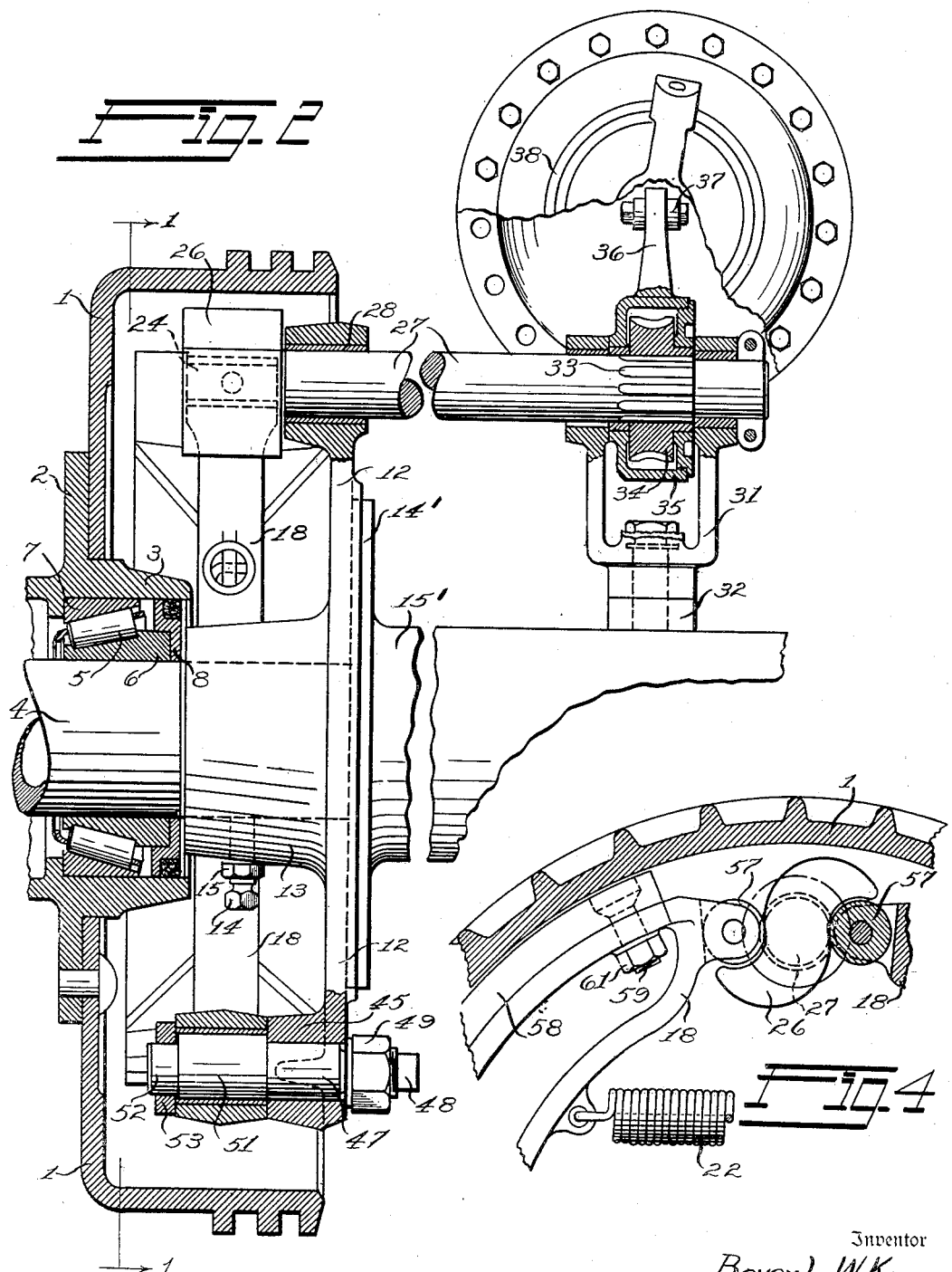

Patented Nov. 7, 1933

1,933,671

UNITED STATES PATENT OFFICE 1,933,671

BRAKE MECHANISM

Beverly W. Keese, Oshkosh, Wis., assignor to Wisconsin Axle Company, Oshkosh, Wis., a corporation Application January 27, 1930. Serial No. 423,785

3 Claims. (Cl. 188—79.5)

This invention relates to a brake mechanism particularly designed for modern transportation facilities such as automobile trucks, buses, coaches, rail cars or the like, but obviously the invention is not limited to such uses.

In an expanding or similar type of brake wherein a plurality of brake members are adapted to engage a brake drum, it is essential for efficient operation of the brake that the actuating member therefor operate equally on all the members. Therefore it is necessary that the brake members be initially spaced equal distances from the drum with which they engage. But this desirable feature is not easy to attain, since unless the parts are very carefully machined and therefore correspondingly expensive to manufacture, the initial brake assembly will not be exactly true. Also a brake mechanism is subjected to severe service conditions especially in modern transportation requiring high speeds and frequent stops, so that even when a brake mechanism is initially installed with correct adjustments, it frequently happens that such adjustments are soon thrown out and the spacing of the brake members is not even.

One object of this invention therefore is to provide a brake mechanism having pivoted brake shoes for engagement with a drum, and embodying readily accessible adjustments to compensate for initial inaccuracies in machining of parts and assembly, and to also compensate for wear and other faults developed in service. In prior brake constructions attempts have been made to provide adjustments for the pivoted brake shoes at one or the other end thereof, to thus adjust the clearance between said members and the drum. Such attempts have been only partially successful in accomplishing the results desired, since an adjustment at one end of the brake member not only does not adjust the other end but frequently throws out an otherwise correct adjustment at the other end. Furthermore, in brakes wherein the shoes are pivoted at one end, these attempts at correct adjustment are complicated by the operating mechanisms for applying the brakes.

Therefore, another object of this invention is to provide readily accessible adjustments for both ends of the brake shoes whereby an exact and correct clearance may be easily attained without disassembling the brake and its operating mechanism.

Another fault in the usual brake mechanisms is that they become noisy after short periods of use. Such noise is usually occasioned by sideplay or lateral movement of the brake shoes.

Another object of this invention is to provide a readily accessible adjustment for taking up and thus eliminating all side-play of the brake shoes, to thus eliminate noise and rattle. This adjustment is so positioned that the initial installation may be easily adjusted to proper clearance, and also subsequent adjustments occasioned by wear may be expeditiously accomplished.

Further objects of this invention are to provide a brake which is rugged and oversize and is comparatively inexpensive to manufacture and simple to install and service, and in which friction of the parts is reduced to a minimum.

These and further objects will be apparent from the following description and appended claims when taken in connection with the accompanying drawings, wherein:

Figure 1 is a sectional view of my improved brake mechanism, taken on line 1—1 of Figure 2 but with the bearings omitted.

Figure 2 is a section taken substantially on line 2—2 of Figure 1.

Figure 3 is a section taken substantially on line 3—3 of Figure 1.

Figure 4 is a broken section similar to Figure 1 showing a modified form.

Referring to Figures 1 and 2 a brake drum 1 is secured to the hub 2 of a wheel or other member, (not shown) said hub 2 having a collar 3 supported from a central shaft 4. Roller bearings 5, having the inner and outer races 6 and 7, are interposed between the collar 3 and the shaft 4, a collar 8 supporting and carrying a gasket 9 in engagement with the collar 3 for preventing leakage of lubricant away from the roller bearing 5.

A stationary spider 12 is supported from the shaft 4 by an outwardly extending collar 13 surrounding shaft 4 and secured thereto by a set screw 14 locked in position by lock nut 15. As seen in Figure 2, the opposite face of the spider 12 is chamfered to receive the corresponding shaped flange 14' of a supporting structure, including a rearwardly extending housing 15', the flange 14' being secured to the spider 12 by a plurality of bolts 16, having nuts 17 thereon.

Brake members or shoes 18 are suitably supported from the spider 12, said shoes carrying the friction blocks 19 secured to the brake shoes 18 by removable keepers or clips 21, the brake shoes 18 being normally retracted by means of a contractile spring 22 secured to perforated lugs 23 on the brake shoes 18, so that the friction blocks 19 do not normally contact with the inner surface of the movable brake drum 1. At their upper ends, the brake shoes 18 removably support hardened wear plates 24 carried by the shoes 18 by means of shanks 25, said wear plates being normally in line engagement with a smooth S-shaped cam member 26 carried on the end of a shaft 27. Shaft 27 is supported in a bearing 28 carried by the spider 12 and extends beyond said spider for operation by any suitable brake operating linkage, preferably by pneumatic or hydraulic means such as shown in connection with Figures 1 and 2.

Shaft 27 is supported at its opposite end by a split bearing-supporting member 31, supported by member 32 secured to the outwardly extending portion 15' carried by the spider 12. The shaft 27 is splined as at 33 and a gear 34 engages with said splines to rotate said shaft. A housing 35 surrounds the gear 34 and is supported for rotation with gear 34 and the shaft 27 by means of cooperating bearing surfaces on said members. The housing 35 has an outwardly extending arm 36 thereon having a clevis 37 secured thereto for operation by the pneumatic or hydraulic means 38. The housing 35 is connected to the gear 34 for simultaneous rotation of said parts by means of a worm gear 41 carried by a shaft 42 having a head 43 projecting out of said housing for engagement by a suitable wrench, said shaft being locked in position by lock nut 44. As seen in Figure 1, the worm 41 meshes with the gear 34 splined to the shaft 27, thus locking the shaft 27 to the housing 35 for simultaneous rotation when the housing is rotated. The shaft 42 carrying the worm gear 41 provides a ready and easily accessible means for adjusting the parts and taking up brake clearance and providing equalization of braking. By loosening the lock nut 44 the head 43 may be rotated to vary the position of the housing 35 with respect to the gear 34, without disassembling any of the parts. This adjustment will alter the position of cam member 26, so that the upper ends of the brake shoes may be adjusted to compensate for inaccuracies of machining of parts or to compensate for wear.

The lower end of the spider 12 is provided with two bearings 45 supporting the pivot pins 47 upon which are mounted the movable brake shoes 18. The pins 47 project beyond the inner face of the spider 12 and have squared heads 48, being threaded to receive lock nuts 49 which engage the face of the spider 12 with a lock washer interposed therebetween for maintaining the pins 47 in set position.

The pins 47 project beyond the inner face of the spider 12 and have eccentric portions 51 thereon, upon which portions the movable brake shoes 18 are mounted. Beyond the eccentric portions 51 the pins 47 have reduced ends 52 which project beyond the shoes 18 and toward the brake drum 1 carried by the wheel flange 2. The ends 52 of pins 47 are supported by a spacer bar 53 having corresponding openings for receiving ends 52, said spacer bar being adjustably supported on the spider 12, by a bolt 54 having a nut 55 on the end thereof.

As seen from Figures 2 and 3, the length of the eccentric portions 51 of pins 47 is slightly less than the thickness of the brake shoes 18, and the threaded portions of said pins which are adapted to receive the lock nuts 49 are of reduced diameter, and the portions of said pins supported in the spider 12 are slightly shorter than the thickness of said spider. The parts are thus proportioned to provide simple adjustments for the brake shoes and to take up wear and prevent rattling of the parts. It will be seen that the pins 47 may be rotated after the lock nuts 49 have been loosened by way of the squared heads 48 to turn the eccentric portions 51 of said pins with relation to the spider 12. Since the shoes 18 are supported on the eccentrics, such rotation will adjust the shoes 18 toward or from the drums 1, to thus overcome errors in machining, to change the contact point of the friction blocks or linings with the drum, and to compensate for unequal wear on the blocks or linings, said adjustments being expeditiously accomplished from outside of the brake drum. The adjustable wear plate 53 provides a support for the ends of the pins 47 and also takes up side play in the brake shoes 18, since said plate 53 engages with the lower edges of said shoes 18 and by tightening the nut 55 on bolt 54 the plate 53 is drawn toward the spider 12 to thus eliminate any side play or rattle in the movable brake members.

As seen from Figures 2 and 3 the eccentric adjustment of pins 47 and also the adjustment of the plate 53 may be accomplished without disassembling any of the parts, since the nuts 49 and 55 are accessible for ready adjustment. It will also be clear that the adjustment between the shaft 27 and the operating mechanism 38 may be expeditiously accomplished by means of the rotary shaft 42 carrying the worm 41, to thus provide a rapid external adjustment of brake clearance and equalization at the upper end of the brake drums.

Thus it will be seen that the above described brake fully meets the requirements of brakes for modern transportation facilities which must be oversized and rugged and must yet be produced to meet the following requirements:

1. The brake must be produced at a minimum of cost by incorporating adjustments to compensate for machining errors yet maintain a simple construction.

2. The brake must also be readily adjustable to compensate for individual vehicle requirements, such as over-loading, over-speeding, changes in load distribution, and local road conditions.

3. The various adjustments must be readily accessible to reduce maintenance cost, such as in replacing the lining for the brake drums.

4. The brake must be readily adjustable to compensate for wear of the drum and the lining and to likewise provide equalization of brake action, and elimination of dragging of the brake.

5. The brake must be constructed to perform with a minimum of friction, thereby increasing the efficiency of operation, and the adjustable means for maintaining said efficiency must be readily accessible.

The adjustments of my improved brake mechanism described above fully meet these requirements, since the clearance at both ends of the brake drums may be readily adjusted to accurately position the drums to compensate for machining errors, and also to compensate for individual vehicle requirements such as over-loading, over-speeding or changes in load distribution. The adjustments are readily accessible, and the brakes as a whole are rugged in construction and yet may be produced at a minimum of cost.

Furthermore, as seen from Figures 1 and 2, the friction blocks 19 or the brake lining may be easily renewed by simply removing the wheel carrying the hub 2 thus removing the drum 1. The brake shoes 18 are thus exposed and the clips 21 may be simply removed and new friction blocks installed. It will be understood that the invention is not limited to friction blocks 19, since brake lining such as shown in Figure 4 may be used, being held in position by any suitable means.

As further shown in Figure 4, the wear plates 24 on the ends of the brake shoes 18 are replaced by rollers 57 for cooperative engagement by the cam 26 carried on the shaft 27. In this modification as just stated the friction blocks 19 are replaced by linings 58 secured to the drums 18 by bolts 59 having the heads thereof counter-sunk into the lining 58 and secured in position by nuts 61. The operation of the modification shown in Figure 4 is similar to that described in connection with Figures 1 to 3, the provision of the rollers 57, however, reducing friction between the cam 26 and the brake drums 18.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. Brake mechanism comprising a stationary support, a rotatable drum carried by said support, several shoes pivoted on said support at adjacent points and designed to engage said drum for braking purposes, and means for shifting said several shoes laterally to take up any side play, said means including a single adjusting element projecting outwardly for simultaneously shifting the several shoes with one external manipulation.

2. Brake mechanism comprising a stationary support, a drum rotatably carried by said support, a pin rigidly carried by said support and projecting into said drum, a brake shoe pivoted on said pin and slidable longitudinally with respect thereto, a plate shiftable longitudinally of the pin and designed to engage that side of the brake shoe opposite the support, and an adjusting means connected to said plate and projecting outwardly through said stationary support for external manipulation to maintain said plate in proper lateral engagement with said shoe.

3. In the mechanism defined in claim 2, said pin comprising two main integral portions, one of which is releasably clamped in said stationary support and the other of which is journaled within said shoe; said other portion being shorter than the width of the shoe, eccentric relative to the clamped portion and provided with a reduced extension for guiding said plate.

BEVERLY W. KEESE.